US009057629B2

(12) United States Patent
Hohe et al.

(10) Patent No.: US 9,057,629 B2
(45) Date of Patent: Jun. 16, 2015

(54) SENSOR ASSEMBLY AND METHOD FOR DETERMINING A MAGNETIZATION DIRECTION OF AN INDICATOR MAGNET

(71) Applicants: Hans-Peter Hohe, Heiligenstadt (DE); Josef Sauerer, Herzogenaurach (DE)

(72) Inventors: Hans-Peter Hohe, Heiligenstadt (DE); Josef Sauerer, Herzogenaurach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 424 days.

(21) Appl. No.: 13/625,165

(22) Filed: Sep. 24, 2012

(65) Prior Publication Data

US 2013/0027028 A1    Jan. 31, 2013

Related U.S. Application Data

(63) Continuation of application No. PCT/EP2011/053917, filed on Mar. 15, 2011.

(30) Foreign Application Priority Data

Mar. 25, 2010    (DE) .......................... 10 2010 003 292

(51) Int. Cl.
*G01B 7/30* (2006.01)
*G01D 5/14* (2006.01)

(52) U.S. Cl.
CPC .................................... *G01D 5/145* (2013.01)

(58) Field of Classification Search
CPC ..................................................... G01D 5/145
USPC ....................................... 324/207.15, 207.22
See application file for complete search history.

(56) References Cited

U.S. PATENT DOCUMENTS

| 6,310,475 | B1 | 10/2001 | Kawase et al. |
| 7,170,280 | B2* | 1/2007 | Lohberg ................... 324/207.25 |
| 7,535,215 | B2* | 5/2009 | Forster .......................... 324/165 |

(Continued)

FOREIGN PATENT DOCUMENTS

| CN | 1705056 A | 12/2005 |
| CN | 1874363 A | 12/2006 |

(Continued)

OTHER PUBLICATIONS

Official Communication issued in International Patent Application No. PCT/EP2011/053917, mailed on Aug. 11, 2011.

(Continued)

*Primary Examiner* — Reena Aurora
(74) *Attorney, Agent, or Firm* — Keating & Bennett, LLP

(57) ABSTRACT

A sensor assembly for determining a magnetization direction of an indicator magnet with respect to the sensor assembly includes a first magnetic field sensor for detecting a first and a second magnetic field component with respect to a first and a second spatial direction, and a second magnetic field sensor for detecting a third and a fourth magnetic field component with respect to the second spatial direction, wherein the first and the second magnetic field sensor are spaced apart from one another. Further, the sensor assembly includes a processor that is implemented to combine the first and the second magnetic field component to obtain a first combination quantity, to combine the third and the fourth magnetic field component to obtain a second combination quantity, to determine a position of the indicator magnet and the magnetization direction.

20 Claims, 15 Drawing Sheets

(56) References Cited

U.S. PATENT DOCUMENTS

| | | |
|---|---|---|
| 2002/0125884 A1 | 9/2002 | Wendt et al. |
| 2004/0017187 A1 | 1/2004 | Van Ostrand et al. |
| 2004/0207392 A1 | 10/2004 | Kernhof |
| 2005/0258820 A1 | 11/2005 | Forster |
| 2005/0264530 A1 | 12/2005 | Takatsuka et al. |
| 2005/0275399 A1 | 12/2005 | Kitanaka et al. |
| 2006/0267937 A1 | 11/2006 | Takatsuka et al. |

FOREIGN PATENT DOCUMENTS

| | | |
|---|---|---|
| DE | 197 37 142 A1 | 3/1999 |
| DE | 197 41 579 A1 | 3/1999 |
| DE | 198 36 599 A1 | 2/2000 |
| DE | 102 48 060 A1 | 5/2004 |
| DE | 10 2005 027 226 A1 | 1/2006 |
| DE | 10 2005 009 381 A1 | 9/2006 |
| EP | 1 464 918 A2 | 10/2004 |
| EP | 2 159 546 A2 | 3/2010 |
| JP | 2000-105847 A | 4/2000 |

OTHER PUBLICATIONS

Official Communication issued in corresponding Chinese Patent Application No. 201180026098.2, mailed on Sep. 10, 2014.

* cited by examiner $\Rightarrow B_{1z} > 0$ and $B_{2z} > 0$

|  | Bz > 0 | Bz < 0 |
|---|---|---|
| magnet on the negative side of the X axis | magnetization of the magnet in −X direction | magnetization of the magnet in +X direction |
| magnet on the positive side of the X axis | magnetization of the magnet in +X direction | magnetization of the magnet in −X direction |

FIGURE 3E

SENSOR ASSEMBLY AND METHOD FOR DETERMINING A MAGNETIZATION DIRECTION OF AN INDICATOR MAGNET

CROSS-REFERENCE TO RELATED APPLICATIONS

This application is a continuation of copending International Application No. PCT/EP2011/053917, filed Mar. 15, 2011, which is incorporated herein by reference in its entirety, and additionally claims priority from German Application No. DE 10 2010 003 292.1, filed Mar. 25, 2010, which is also incorporated herein by reference in its entirety.

BACKGROUND OF THE INVENTION

Embodiments of the invention relate to a concept for determining a magnetization direction of an indicator magnet. Further embodiments of the invention relate to automatic detection of the magnetization direction in position measurement systems on a magnetic basis.

In the field of linear position measurement system on a magnetic basis, it has long been common to use Hall sensors in connection with moving permanent magnets to monitor single axis linear movements. In principle, such systems are structured as shown in FIG. 10. There is a fixed sensor 10 across which a permanent magnet 12 moves in a linear manner. The sensor 10 measures respective magnetic field values and provides these values to an evaluation unit calculating a current position of a magnet 12 therefrom. In the coordinate system shown in FIG. 10, the X axis is essentially parallel to the linear axis of movement of the permanent magnet 12. Further, X axis and Z axis are in the plane of the drawing, while the Y axis is perpendicular to the plane of the drawing.

According to the known technology, there are different evaluation approaches for determining the position of a moving magnet with Hall sensors.

The most simple form of a procedure for position determination known in the technology uses the linear range 20 of the Z components 22 of the magnetic field, as shown exemplarily in FIG. 11. For the illustrated example, this is possible in the range of −0.005 m to +0.005 m (=+/−5 mm). Significant non-linearities occur at the boundaries, such that linearization has to be used already for this relatively small measurement range.

This type of evaluation is relatively easy to implement but has great disadvantages during application. On the one hand, magnet temperature and, for example, production-induced scattering of the magnetization have a direct influence on the measurement accuracy, since the position value is directly derived from the absolute value of a magnetic field component. On the other hand, the useable travel range of the permanent magnet with respect to the sensor in relation to the area where measurable fields (i.e. fields that are significantly larger than the earth's magnetic field of approximately 50 µT) of the magnet exist, is relatively small. Thus, with this method, neither the detection range of the sensor nor the magnetic field components provided by the permanent magnet are utilized fully and additionally, a position signal depending on the temperature of the permanent magnet results.

In a further procedure known in the conventional technology according to DE 19836599 A1, in order to be independent of the temperature of the magnet, a method is used that uses the ratio of the two magnetic field components Bx 30 and Bz 22 and, for example, its arctan calculation for position determination (see FIG. 12). Since the position is determined from the ratio of two field components, this method is independent of the temperature, both of the sensor chip and the magnet. Further, the usable travel range is larger than in the method described above.

However, there is the general problem that also in this method according to FIG. 12, the travel range is not limited by the height of the measured field components but by the evaluation method. Thus, also in this method, the theoretically possible travel range between sensor and permanent magnet is also not utilized fully.

SUMMARY

According to an embodiment, a sensor assembly for determining a magnetization direction of an indicator magnet may have: a first magnetic field sensor for detecting a first magnetic field component with respect to a first spatial direction and a second magnetic field component with respect to a second spatial direction; a second magnetic field sensor for detecting a third magnetic field component with respect to the first spatial direction and a fourth magnetic field component with respect to the second spatial direction; wherein the first magnetic field sensor and the second magnetic field sensor are arranged spaced apart from one another; and a processing means that is implemented to combine the first magnetic field component and the second magnetic field component to obtain a first combination quantity; to combine the third magnetic field component and the fourth magnetic field component to obtain a second combination quantity; to determine a position of the indicator magnet with respect to the sensor assembly based on a comparison of the first combination quantity and the second combination quantity; and to determine the magnetization direction based on the determined position of the indicator magnet with respect to the sensor assembly and on a sign of a detected magnetic field component with respect to the second spatial direction.

According to another embodiment, a method for determining a magnetization direction of an indicator magnet with respect to a sensor assembly, wherein the sensor assembly includes a first magnetic field sensor for detecting a first magnetic field component with respect to a first spatial direction and a second magnetic field component with respect to a second spatial direction, and a second magnetic field sensor spaced apart therefrom for detecting a third magnetic field component with respect to the first spatial direction and a fourth magnetic field component with respect to the second spatial direction, may have the steps of: combining the first magnetic field component and the second magnetic field component to obtain a first combination quantity; combining the third magnetic field component and the fourth magnetic field component to obtain a second combination quantity; determining a position of the indicator magnet with respect to the sensor assembly based on a comparison of the first combination quantity and a second combination quantity; and determining the magnetization direction based on the determined position of the indicator magnet with respect to the sensor assembly and on a sign of a detected magnetic field component with respect to the second spatial direction.

Another embodiment may have a computer program product with a computer program including software for performing the inventive method, when the computer program runs on a processor.

Embodiments of the present invention provide a sensor assembly for determining a magnetization direction of an indicator magnet with respect to the sensor assembly, wherein the sensor assembly comprises a first magnetic field sensor for detecting a first magnetic field component with respect to a first spatial direction and a second magnetic field component with respect to a second spatial direction, and a second magnetic field sensor for detecting a third magnetic field component with respect to the first spatial direction and a fourth magnetic field component with respect to the second spatial direction. Here, the first magnetic field sensor and the second magnetic field sensor are arranged spaced apart from each other. Further, the sensor assembly comprises a processing means that is implemented to combine the first magnetic field component and the second magnetic field component to obtain a first combination quantity, to combine the third magnetic field component and the fourth magnetic field component to obtain a second combination quantity, to determine a position of the indicator magnet with respect to the sensor assembly based on a comparison of the first combination quantity and the second combination quantity, and to determine the magnetization direction based on the determined position of the indicator magnet with respect to the sensor assembly and on a sign of a detected magnetic field component with respect to the second spatial direction.

It is a finding of the present invention that the just stated enlargement of the travel range of the indicator magnet with respect to the sensor assembly, with simultaneously increased robustness with regard to external spurious influences can be obtained, for example by using a four-quadrant evaluation method, as it will be described in more detail in the invention, by determining the magnetization direction of the indicator magnet based on the determined position of the indicator magnet with respect to the sensor assembly and on a sign of a detected magnetic field component with respect to the second spatial direction. With this procedure, in particular by using the four-quadrant evaluation method (in a position measurement system on a magnetic basis), enlargement of the practically usable travel range of the indicator magnet with respect to the sensor assembly and at the same time increased robustness of the measurement assembly with regard to spurious influences can be obtained.

In other words, in the present invention, first, for determining the magnetization direction, the current position of the magnet with respect to the sensor, i.e. with respect to a reference point defined by the sensor, is determined. Thus, it is determined, for example, whether the indicator magnet is on the negative or positive side of the X axis, wherein the reference point is assumed, for example, as zero point of the X axis. This information can be obtained by providing, on the sensor chip, not only a multi-axis magnetic field sensor but two sensors juxtapositioned in X direction. Here, it is assumed that the X direction is parallel to the relative movement between sensor assembly and indicator magnet.

In embodiments of the invention, a processing means is implemented to determine a first position of the indicator magnet with respect to the sensor assembly, when a magnitude or an absolute value of a first combination quantity of two magnetic field components at the first magnetic field sensor is greater than a magnitude of a second combination quantity of two magnetic field components at the second magnetic field sensor, and to determine a second position of the indicator magnet with respect to the sensor assembly when the magnitude of the second combination quantity is greater than the magnitude of the first combination quantity.

In other words, the sensor wherein in particular the magnitude of the magnetic field is highest is closer to the magnet. Thus, by comparing the magnetic field magnitudes at the locations of the two magnetic field sensors measuring in a multi-axis manner, it can be derived whether the magnet is on the positive or negative side of the X axis.

In further embodiments of the invention, the processing means is further implemented to state, when the first position has been determined, a first magnetization direction at a positive sign of the second magnetic field component or the fourth magnetic field component, and to state a second magnetization direction when the second position has been determined, and to state, when the first position has been determined, the second magnetization direction at a negative sign of the second magnetic field component or the fourth magnetic field component, and to state the first magnetization direction when the second position has been determined. Thus, with the knowledge on what side the magnet is, in a second step, in particular by considering the Z component of the magnetic field, the magnetization direction of the magnet can be clearly derived.

BRIEF DESCRIPTION OF THE DRAWINGS

Embodiments of the present invention will be detailed subsequently referring to the appended drawings, in which:

FIG. 3e is an overview of the four arrangements shown in FIGS. 3a to 3d;

DETAILED DESCRIPTION OF THE INVENTION

Before the present invention will be discussed below in more detail based on the Figures, it should be noted that in the following embodiments the same elements or functionally equal elements are provided with the same reference numbers in the figures. Thus, a description of elements having the same reference numbers is inter-exchangeable and/or applicable in the different embodiments.

Figure 1A:
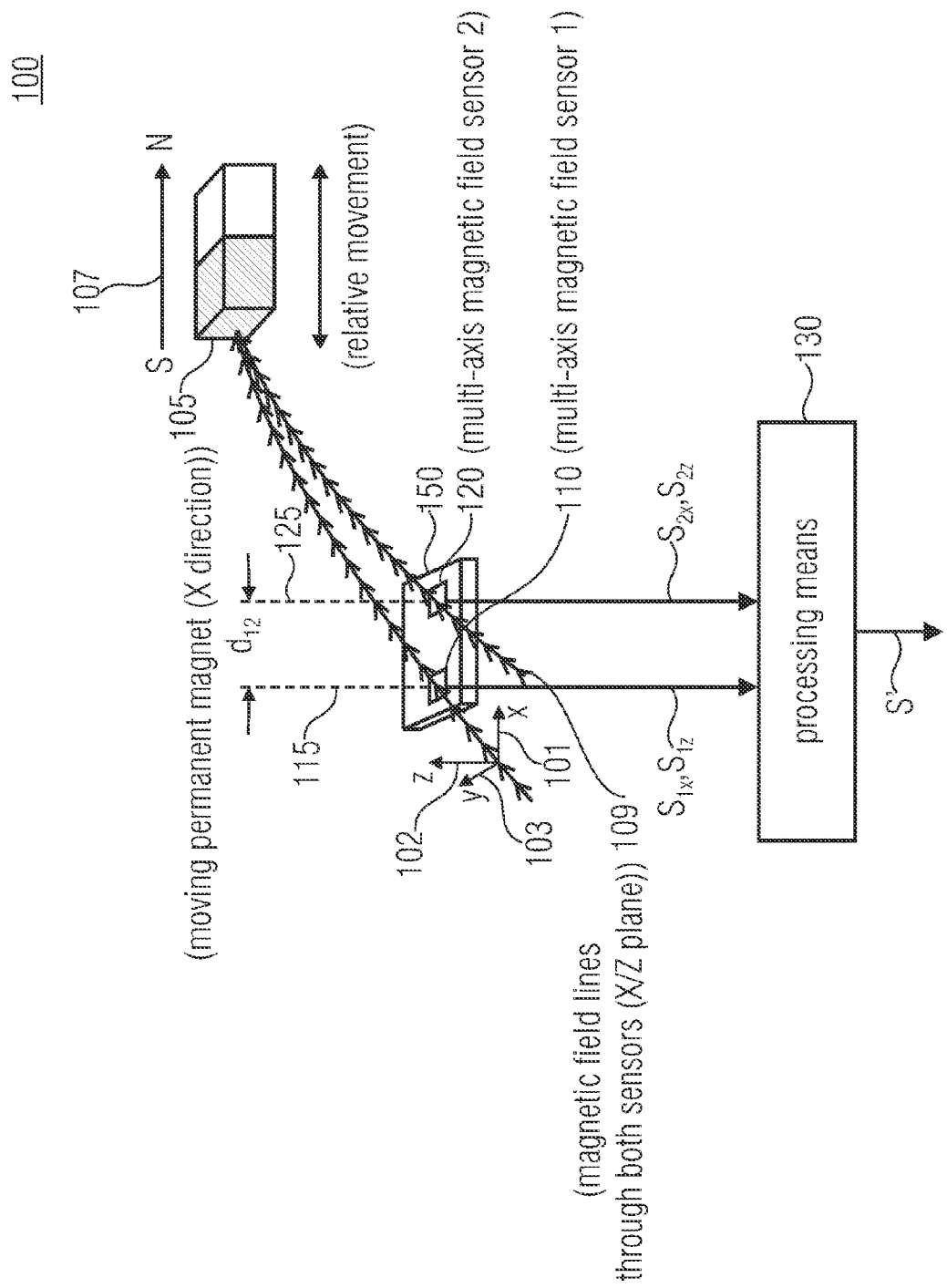
FIG. 1a-b is a sensor assembly for determining a magnetization direction of an indicator magnet according to an embodiment of the present invention.

FIG. 1a shows a sensor assembly 100 for position determination of an indicator magnet, which can also be referred to as encoder magnet or sensor magnet or position magnet 105, according to an embodiment of the present invention. As shown in FIG. 1a, the sensor assembly 100 comprises a first magnetic field sensor 110, a second magnetic field sensor 120 and a processing means 130. The first magnetic field sensor 110 and the second magnetic field sensor 120 can in particular be implemented as multi-axis magnetic field sensors, such as a combination of magnetic field sensors sensitive with respect to different spatial directions (e.g. vertical/horizontal Hall sensors or Hall elements). Here, the magnetic field sensors 110, 120 can each be sensitive with respect to different linearly independent spatial directions, such as with respect to an X direction 101 and a Z direction 102 for a magnetic field of the indicator magnet 105.

The coordinate system of FIG. 1a is defined by the fact that the X axis is substantially parallel to a linear relative direction of movement of the indicator magnet 105 with respect to the sensor assembly 100. Further, the X axis and the Z axis are in the plane of the drawing, while the Y axis is perpendicular to the plane of the drawing. This means the X axis points in an axial direction (X direction 101) with respect to the relative direction of movement between indicator magnet and sensor assembly, while the Z axis points in a radial direction (Z direction 102). Further, a magnetic field component corresponds to an axial component $B_x$ with respect to the axial direction, while the magnetic field component corresponds to a radial component $B_z$ with respect to the radial direction, wherein a magnetic field component with respect to an Y direction 103 that is perpendicular to a plane spanned by the X axis and the Z axis, is considered to be negligible in the present case for symmetry reasons.

In the sensor assembly 100, the first magnetic field sensor 110 at a first position 115 and the second magnetic field sensor 120 at a second position 125 are arranged spaced apart from another. As shown in FIG. 1a, the two magnetic field sensors 110, 120 can be arranged, for example, on a sensor chip 150. The indicator magnet 105 can, for example, be implemented as permanent magnet or as electro magnet. In embodiments of the invention, the indicator magnet 105 can be moved in relation to the sensor assembly 100 for example in a linear manner along an axis (e.g. in parallel to the X direction 101). The exemplary linear relative movement can take place, for example by moving the indicator magnet 105 and the sensor assembly 100 being stationary, or by moving the sensor assembly 100 and the indicator magnet 105 being stationary, or by moving the sensor assembly 100 and the indicator magnet 105 relative to each other. As shown in FIG. 1a, magnetic field lines 109 originating from the indicator magnet 105 penetrate the two magnetic field sensors 110, 120, each at positions 115 and 125. In the situation illustrated in FIG. 1a, where the indicator magnet 105 comprises a magnetization direction 107, the magnetic field lines 109 are in a X/Z plane and comprise components in positive X or Z direction 101, 102. The two magnetic field sensors 110, 120 can each output sensor signals $S_{1x}$, $S_{1z}$ and $S_{2x}$, $S_{2z}$ in dependence on measured magnetic field components $B_{1x}$, $B_{1z}$ and $B_{2x}$, $B_{2z}$ and in particular proportional to the measured magnetic field components $B_{1x}$, $B_{1z}$ and $B_{2x}$, $B_{2z}$. The respective magnetic field components are processed and evaluated in the processing means 130 to obtain finally, for example, an output signal S', comprising, for example, information on a magnetization direction 107 of the indicator magnet 105.

Figure 1B:
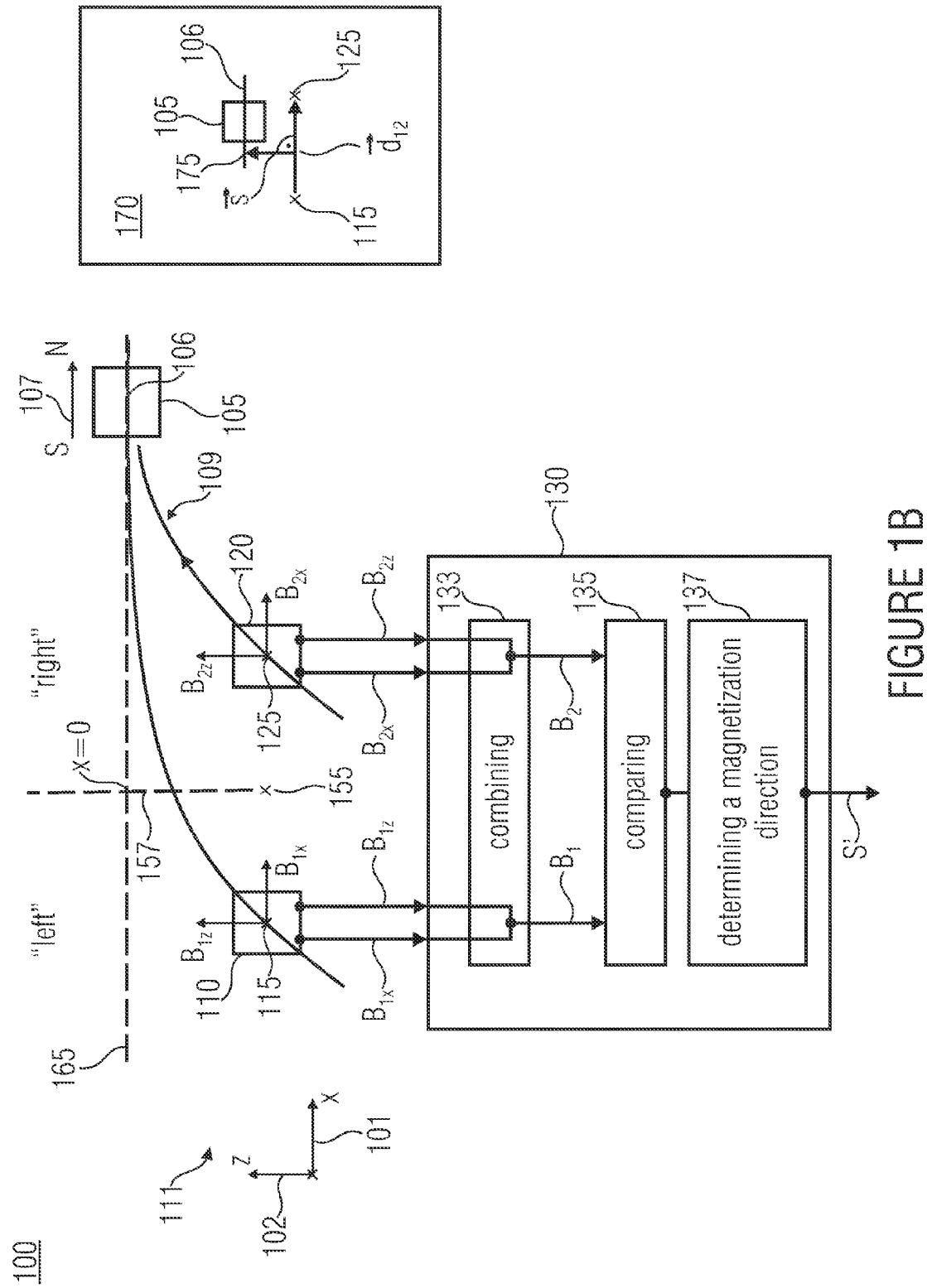

FIG. 1b shows further details of the sensor assembly 100 shown in FIG. 1a. In embodiments of the invention, the first magnetic field sensor 110 and the second magnetic field sensor 120 each comprise two sensor elements, wherein the sensor elements are sensitive with respect to different spatial directions 101, 102. In particular, the sensor elements of the first magnetic field sensor 110 are implemented to output a first magnetic field component $B_{1x}$ in a first spatial direction (e.g. X direction 101) and a second magnetic field component $B_{1z}$ in a second spatial direction (e.g. Z direction 102). Further, the sensor elements of the second magnetic field sensor 120 are implemented to output a third magnetic field component $B_{2x}$ in the first spatial direction 101 and a fourth magnetic field component $B_{2z}$ in the second spatial direction 102. In embodiments of the invention, the sensor elements of the first magnetic field sensor 110 and the second magnetic field sensor 120 each comprise comparable magnet sensitivities with respect to the different spatial directions 101, 102. As shown in FIG. 1b, the two magnetic field sensors 110, 120 are arranged spaced apart from one another with respect to the X direction 101.

In typical applications, the distance of the two pixel cells will, for example, be in a range of approximately 1 mm to 10 mm, since the inventive concept can very advantageously be applied in monolithically integrated systems. The distance from the center of the magnet to the sensor surface can, for example, be between 0.5 mm and 100 mm. In a very small indicator magnet (2 mm×2 mm×2 mm), the useful distance will be at approximately 0.5 mm to 10 mm, while in a ring magnet (di=15 mm, da=25 mm, h=5 mm) distances of 5 mm to 50 mm are useful and in a cuboid magnet of (20 mm×50 mm×50 mm), distances of up to 100 mm and more can be useful. Basically, the distance between magnet and sensor depends on the size of the magnet.

The processing means 130 is implemented to combine the first magnetic field component $B_{1x}$ and the second magnetic field component $B_{1z}$ to obtain a first combination quantity $B_1$, and to combine the third magnetic field component $B_{2x}$ and the fourth magnetic field component $B_{2z}$ to obtain a second combination quantity $B_2$ (step 133). Further, the processing means 130 is implemented to determine, based on a comparison of the first combination quantity $B_1$ and the second combination quantity $B_2$, a position of the indicator magnet 105 with respect to the sensor assembly 100 (step 135). Finally, the processing means 130 is implemented to determine the magnetization direction 107 based on the determined position of the indicator magnet 105 with respect to the sensor assembly 100 and a sign of a detected magnetic field component $B_z$ with respect to the second spatial direction 102 (step 137). Finally, the information on the magnetization direction of the indicator magnet 105 can be allocated to the output signal S' of the processing means 130, or the processing means 130 can provide the signal S' indicating the magnetization direction.

In embodiments of the invention, the position of the indicator magnet 1005 with respect to a reference point 155 of the two sensor positions 115, 125 can be set. As shown in FIG. 1b, the reference point 155 can, for example, be a symmetry point in the center between the two sensor positions 115, 125. Further, a zero point position "0" can be allocated to the reference point 155. In embodiments of the invention, a position of the indicator magnet 105 on the left side of the zero point "0" ("left") represents a first position, while a position of the indicator magnet 105 on the right side of the zero point "0" ("right") represents a second position. Here, the respective position refers to the position of the indicator magnet 105 with respect to a perpendicular bisector 157 of the two sensor positions 115, 125 through the reference point 155. Further, the reference point 155 can in particular represent an origin of the coordinate system 111, which is spanned in the plane of the drawing by the linearly independent spatial directions 101, 102 (e.g. X, Z directions). The Y direction 103 is perpendicular to the plane of the drawing. In particular, the magnetic field components correspond, with respect to the two spatial directions 101, 102 as described above, to the axial or radial components $B_x$, $B_z$, wherein the component $B_y$ perpendicular thereto can be neglected. For symmetry reasons, in embodiments, the reference point is in the center between the two sensor positions. As an alternative, any reference point with respect to the sensor assembly 100 could be selected.

In further embodiments of the invention, the first magnetic field sensor 110 and the second magnetic field sensor 120 are implemented to each detect the first magnetic field component $B_{1x}$ and the third magnetic field component $B_{2x}$ in an axial direction and the second magnetic field component $B_{1z}$ and the fourth magnetic field component $B_{2z}$ in a radial direction, when the indicator magnet 105 with a magnetic axis 106 is shifted with respect to the two magnetic field sensors 110, 120, for example along a shifting line 165 in parallel to the X direction 101.

With reference to a partial illustration 170 of FIG. 1b, the axial direction is defined by a distance vector $\vec{d}_{12}$ of the two sensor positions 115, 125 and the radial direction by a direction vector $\vec{s}$ that is perpendicular to the distance vector $\vec{d}_{12}$ and comprises an intersection 175 with the magnet axis 106.

In further embodiments of the invention, the processing means 130 is implemented to respectively combine the first magnetic field component $B_{1x}$ with the second magnetic field component $B_{1z}$ and the third magnetic field component $B_{2z}$ with the fourth magnetic field component $B_{2z}$ each such that a magnitude $|B_1|$ of the first combination quantity represents a magnitude function $|(B_{1x}, B_{1z})|$ and a magnitude $|B_2|$ of the second combination quantity represents a magnitude function $|(B_{2x}, B_{2z})|$. Thus, the magnitude $|B_1|$ or the magnitude $|B_2|$ is a measure for the whole magnetic field strength at the first sensor position 115 and the second sensor position 125, which can be calculated, for example, via the following relation $$|B_1| = \sqrt{B_{1x}^2 + B_{1z}^2} \quad (1)$$

$$|B_2| = \sqrt{B_{2x}^2 + B_{2z}^2} \quad (2)$$

Figure 2:
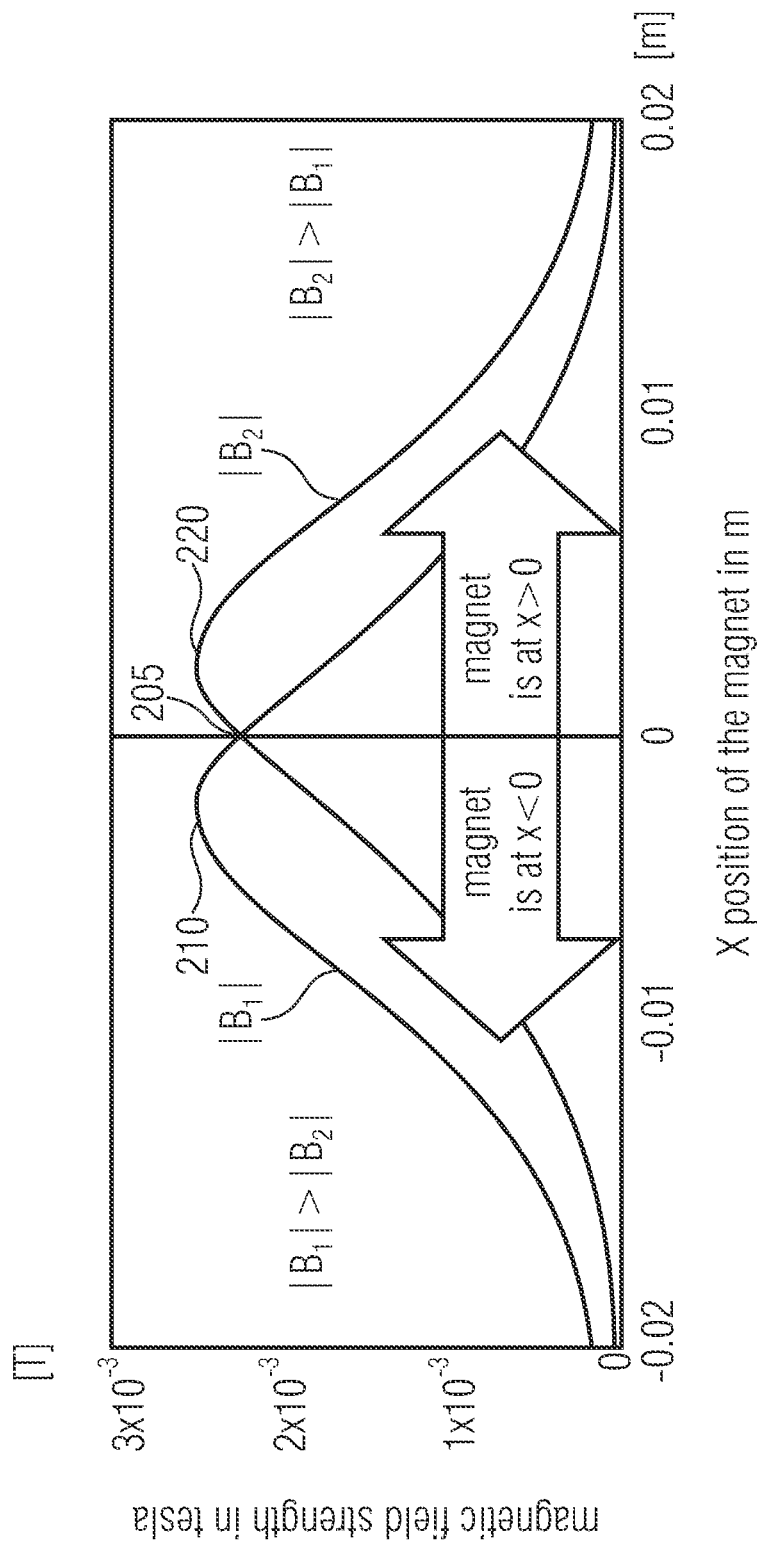
FIG. 2 is exemplary curves of the magnitudes of a first combination quantity of two magnetic field components of a first magnetic field sensor and a second combination quantity of two magnetic field components of a second magnetic field sensor with respect to an X position of the indicator magnet.
Figure 3A:
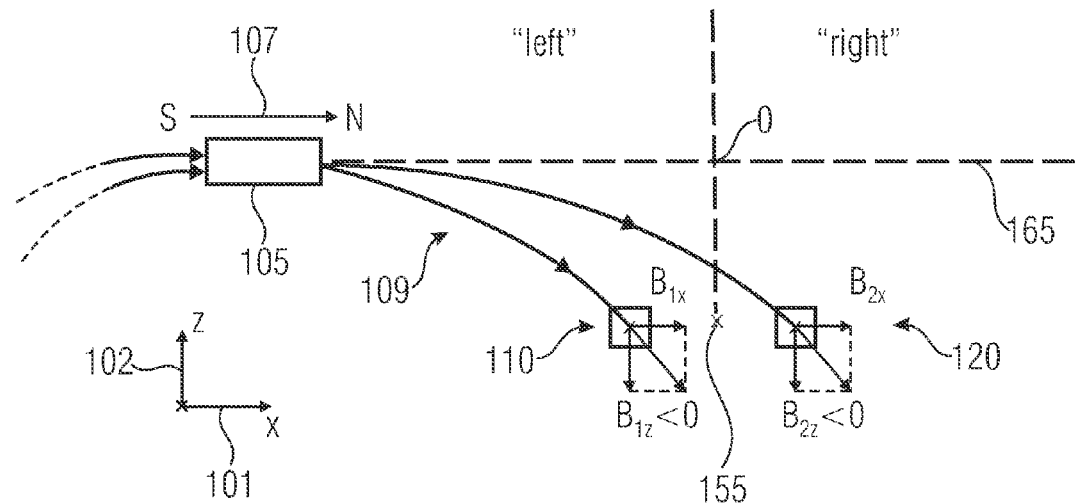
FIG. 3a-d are schematic diagrams for determining a magnetization direction of an indicator magnet with respect to four different arrangements of the indicator magnet with respect to the sensor assembly.
Figure 3B:
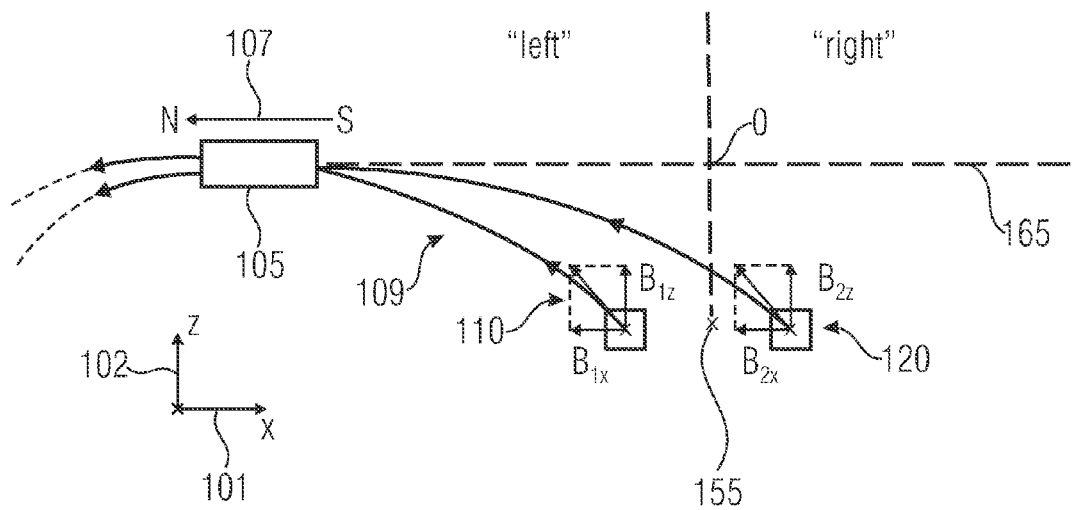
Figure 3C:
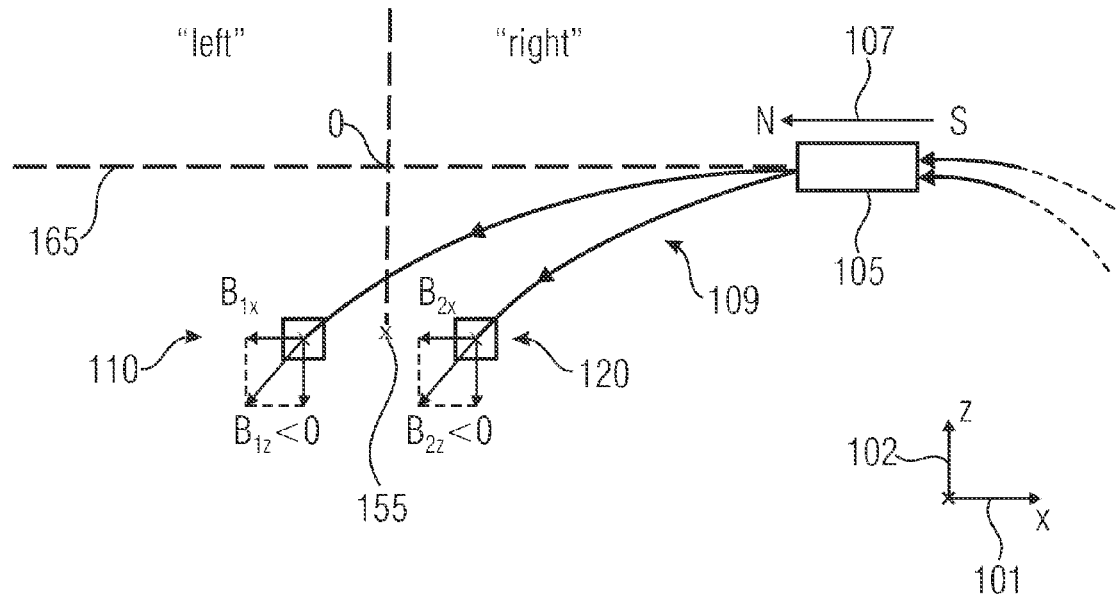
Figure 3D:
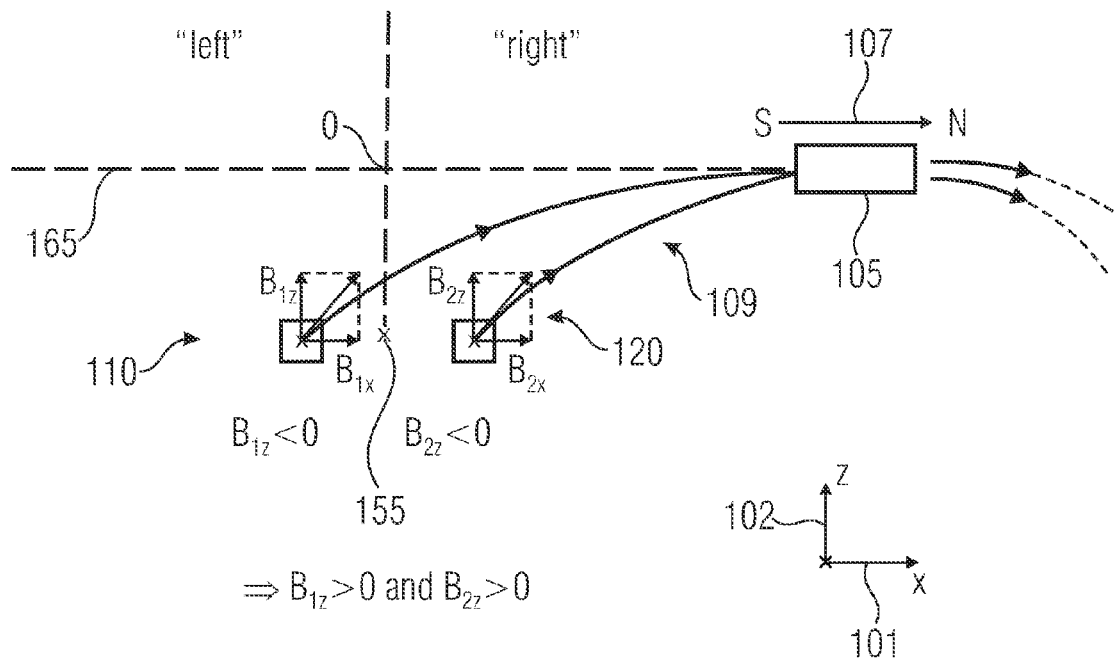

FIG. 2 shows exemplarily curves of the magnitudes of the first combination quantity of the first magnetic field sensor 110 and the second combination quantity of the second magnetic field sensor 120 with respect to an X position of the indicator magnet 105. FIG. 2 shows exemplarily the magnetic field strength in tesla on the vertical axis and the X position of the magnet in meter on the horizontal axis. Here, the X position of FIG. 2 corresponds essentially to a position of the indicator magnet 105 on the linear shifting line 165 of FIG. 1b. Further, the X position zero shown in FIG. 2 corresponds essentially to the zero point position "0" shown in FIG. 1b. With reference to FIG. 2, the two output signals comprise typical magnetic field strengths between zero and $3 \times 10^{-3}$ T in a range between −20 mm and +20 mm. Further, it can be seen that the curves of $|B_1|$ and $|B_2|$ comprise an intersection 205 essentially allocated to the X position zero.

In embodiments of the invention, the processing means 130 is implemented to determine a first position ("left" of the reference point 155 or the zero point position "0") when the magnitude $|B_1|$ of the first combination quantity is higher than the magnitude $|B_2|$ of the second combination quantity, and to determine a second position ("right" of the reference point 155 or the zero point position "0"), when the magnitude $|B_2|$ of the second combination quantity is higher than the magnitude $|B_1|$ of the first combination quantity. Here, the position is defined by a range of negative X values to the left of the position of the intersection 205 and the second position by a range of positive X values to the right of the position of the intersection 205, as indicated in FIG. 2 by the respective arrows with the designation "magnet is at x<0" or "magnet is at x>0".

Thus, in embodiments, by comparing magnitudes $|B_1|$ and $|B_2|$ of combination quantities $B_1$ and $B_2$, each provided by the two magnetic field sensors 110, 120, the position of the indicator magnet 105 can be determined and allocated. Thus, the sensor that essentially provides the greater output signal or determines the greater magnetic field strength is closer to the indicator magnet 105.

Further, as described above, the processing means 130 is implemented to determine the magnetization direction 107 based on the determined position of the indicator magnet 105 with respect to the sensor assembly 100 and on a sign of a detected magnetic field component ($B_z$) with respect to the second spatial direction 102 (FIG. 1b, step 137).

For illustrating purposes, FIGS. 3a to 3d show four different arrangements of the indicator magnet 105 with respect to the reference point 155. In FIGS. 3a to 3d, the indicator magnet 105 comprises, on the one hand, the first position ("left") or the second position ("right"), i.e. the same is either on the left side or on the right side of the zero point "0" of the shifting line 165, and, on the other hand, the indicator magnet 105 comprises a magnetization direction 107 in a positive or negative X direction 101. The magnetic field lines 109 each run corresponding to the magnetization direction 107, as shown in FIGS. 3a to 3d, wherein the magnetization direction 107 is given by a north pole (N) and a south pole (S) of the indicator magnet 105. In particular, in FIGS. 3a, 3b, the indicator magnet 105 has the first position, while the same has the second position in FIGS. 3c, 3d. Further, in FIGS. 3a, 3b, the magnetization direction 107 of the indicator magnet 105 points in the positive X direction, while the same points in the negative X direction in FIGS. 3b, 3c.

With reference to FIGS. 3a-3d, based on the knowledge of the position (i.e. indicator magnet on the left side or on the right side), the magnetization direction 107 can be derived from a Z component $B_{1z}$, $B_{2z}$ of the magnetic field or $B_z$ measured by means of the first magnetic field sensor 110 or the second magnetic field sensor 120.

In the further embodiments of the invention, the processing means 130 is implemented to detect, when the first position has been determined, a first magnetization direction at a positive sign of the second magnetic field component $B_{1z}$ or the fourth magnetic field component $B_{2z}$, and to detect a second magnetization direction when the second position has been determined, and to detect, when the first position has been determined, the second magnetization direction at a negative sign of the second magnetic field component $B_{1z}$ or the fourth magnetic field component $B_{2z}$ and to detect the first magnetization direction when the second position has been determined. Here, the first magnetization direction points in the negative X direction (see FIGS. 3b, 3c) while the second magnetization direction points in the positive X direction (see FIGS. 3a, 3b).

The table of FIG. 3e summarizes the described four cases for the possible arrangements resulting in dependence on the position and the sign of the Z component $B_z$.

For a robust implementation of the just described procedure, in practice, the region around the zero point (reference point) can be treated separately, since it can happen due to asymmetries of the magnet or other non-ideal conditions that the intersection of, for example, the two magnitude functions (intersection 205 in FIG. 2) for detecting the side on which the magnet resides is not exactly at the same position as the zero position of the Z component of the magnetic field. This might lead to incorrect decisions in the center of the measurement range.

To make the system robust with respect to this specific case, the magnetization detection in the "proximity" of position zero should be derived directly from the X component of the magnetic field. As a criterion, when the magnet is close to the position zero, for example, a comparison of the magnitudes of field components $B_x$ and $B_z$ can be used.

In further embodiments of the invention, the processing means 130 is implemented to determine whether the indicator magnet 105 is within a central region 410 around the reference point 155 of the sensor assembly 100. For this, a magnetic field component $B_x$ detected by the first magnetic field sensor 110 or the second magnetic field sensor 120 with respect to the first spatial direction 101 or values derived therefrom is compared to a magnetic field component $B_z$ detected by the first magnetic field sensor 110 or the second magnetic field sensor 120 with respect to the second spatial direction 102 or values derived therefrom. If the comparison has the result, for example, that the indicator magnet 105 is within the central region 410, the magnetization direction 107 will be determined based on a sign of a detected magnetic field component $B_x$ (longitudinal component or axial component) with respect to the first spatial direction 101. If, however, the indicator magnet 105 is outside the central region 410, the magnetization direction 107 will be determined according to the procedure described based on FIG. 2 and FIGS. 3a-d.

Figure 4:
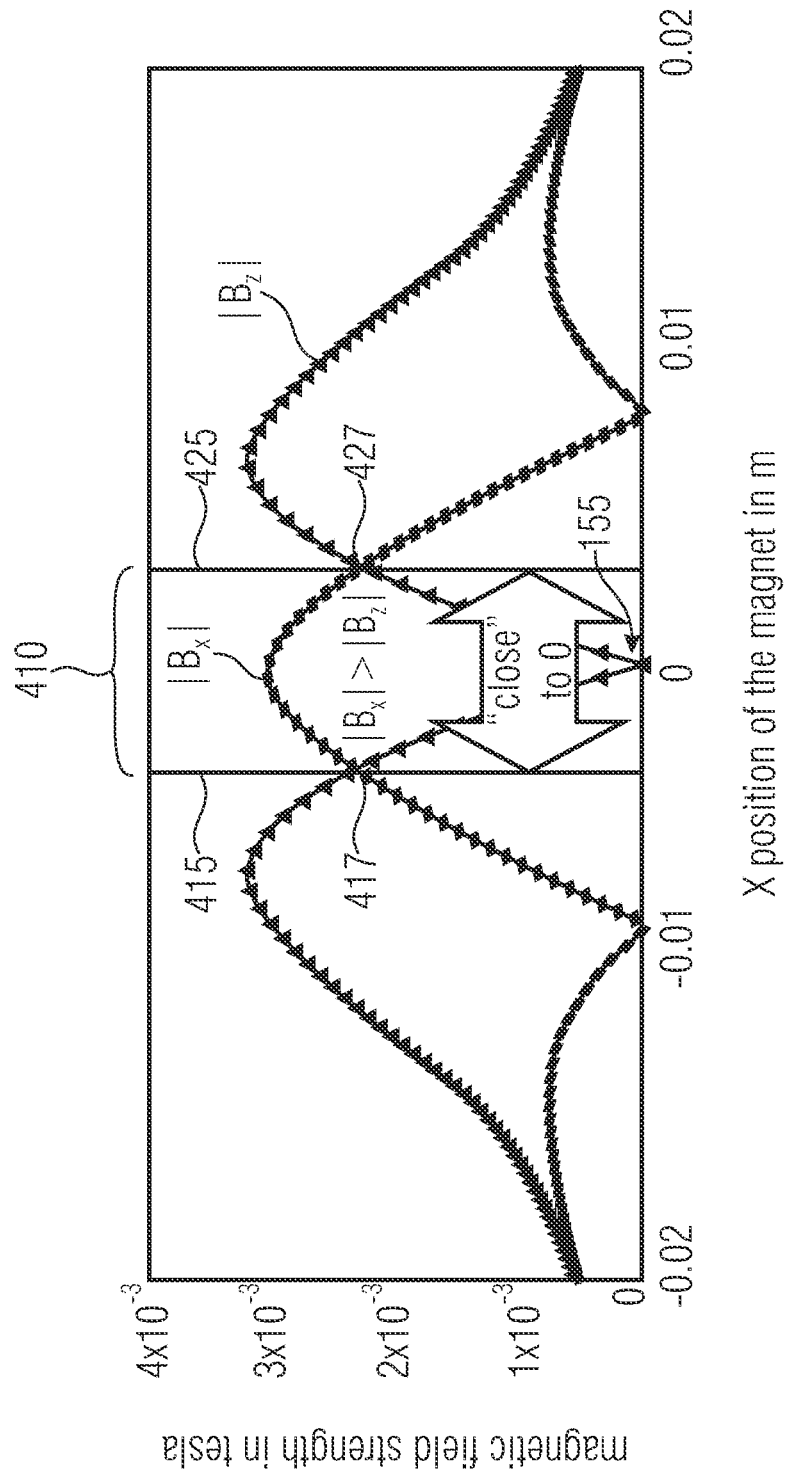
FIG. 4 are exemplary curves of the magnitudes of a magnetic field component detected by the first or second magnetic field sensor with respect to a first spatial direction, and a magnetic field component detected by the first or second magnetic field sensor with respect to the second spatial direction for determining whether the indicator magnet is within a central region around a reference point of the sensor assembly.

In this context, FIG. 4 shows exemplary curves of magnitudes $|B_x|$ and $|B_z|$ with typical magnetic field strengths between 0 and $4 \times 10^{-3}$T with respect to the X position of the indicator magnet 105 in a range of approximately −20 mm to +20 mm. FIG. 4 shows a central region 410 that surrounds the reference point 155 and is defined by the condition $|B_x|>|B_z|$. Thus, in this region 410, the magnetic field strength ($B_x$) of the X component is greater than the magnetic field strength ($B_z$) of the Z component. The central region 410 is further illustrated in FIG. 4 by a double arrow indicated by "close to zero" and limited by two positions 415, 425 corresponding to two intersections 417, 427 of $|B_x|$ and $|B_z|$. In particular, the central region 410 extends, for example, from approximately −5 mm to +5 mm. Here, it should be noted that for defining the central region 410 other suitable curves, for example, derived from the curve of magnitudes $|B_x|$ and $|B_z|$ can also be used.

In further embodiments of the invention, the processing means 130 is implemented to determine, at a positive sign of the detected magnetic field component $B_x$ with respect to the first spatial direction 101, the first magnetization direction of the indicator magnet 105 and to determine, at a negative sign of the detected magnetic field component $B_x$ with respect to the first spatial direction 101, the second magnetization direction of the indicator magnet 105, when a magnitude $|B_x|$ of the detected magnetic field component with respect to the first spatial direction 101 is greater than a magnitude $|B_z|$ of the detected magnetic field component with respect to the second spatial direction 102.

Figure 5:
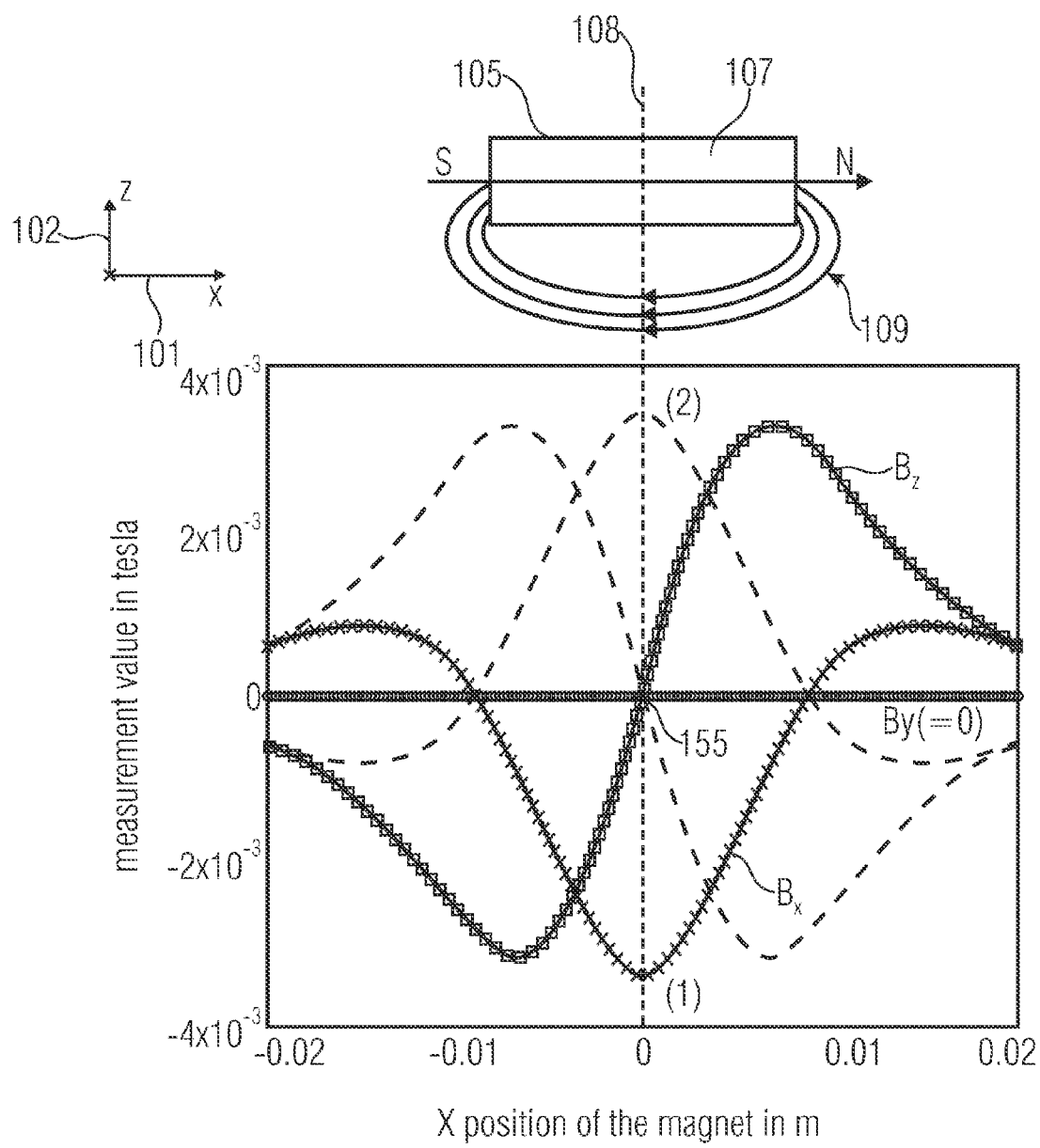
FIG. 5 is a schematic diagram for determining the magnetization direction of an indicator magnet with respect to FIG. 3 which is in the central region shown in FIG. 4.

For illustration purposes, FIG. 5 shows an exemplary situation where the indicator magnet 105 is in particular in the central region shown in FIG. 4, i.e. close to the X position "zero". This is characterized in that a symmetry axis 108 (dotted line) of the indicator magnet 105 runs essentially through the reference point 155. In the following, two cases (1), (2) can be considered. If the magnetization direction 107 (|S–N| pole assembly in the magnet) points in the positive X direction (case 1), the magnetic field lines 109 close to the zero point position will essentially point in the negative X direction. If, however, the magnetization direction 107 points in the negative X direction (case 2), the magnetic field lines 109 close to the zero point position will essentially point in the positive X direction. The magnitude $|B_z|$ of a Z component $B_z$ of the magnetic field practically disappear close to zero. In FIG. 5, case (1) is illustrated by the measurement values with the straight lines, while case (2) is illustrated by the dotted lines. Further, the first magnetization direction is defined by the negative X direction and the second magnetization direction by the positive X direction.

In other words, in particular when the magnitude of $B_x$ or a value derived therefrom, such as $B_x^2$ is greater than the magnitude of $B_z$ or a value derived therefrom, such as $B_z^2$, then the position is close to position zero, and the magnetization direction can be determined directly from the inverted sign of the X component of the magnetic field.

In further embodiments of the invention, the processing means 130 can be implemented to determine the magnitude $|B_x|$ and the magnitude $|B_z|$ each via a magnitude function applied to the first magnetic field component $B_{1x}$ or the third magnetic field component $B_{2x}$ or the second magnetic field component $B_{1z}$ or the fourth magnetic field component $B_{2z}$. With reference to FIG. 4, for example, $|B_x|$ or $|B_z|$ can be weighted by a weighting factor, such that the central region 410 around the reference point 155 is changed, for example, reduced. If, in further embodiments of the invention, a weighting factor between 0.25 and 1 is selected for $|B_x|$, the respective measurement values with respect to the Y axis will be compressed, and the two positions 415, 425 with respect to intersections 417, 427 shift in the direction of the reference point 155, i.e. the central area 410 around the reference point 155 becomes smaller.

Thus, in terms of a robust implementation or design of the invention, it can be advantageous to provide one of the two magnitudes with a weighting factor prior to the comparison. In particular, a weighting factor at the X component between 0.25 and 1 results in a further enlargement of the travel range. At the same time, the exclusion region close to zero becomes smaller.

As can be seen in FIG. 4 at the edges (left and right), there are regions at the edge where the magnitude $B_x$ becomes greater than the magnitude $B_z$. However, this is a criterion for the region "close to zero" and would result in a wrong magnetization direction decision in these edge regions. By a factor of less than 1 in the X component, this intersection will move further towards the outside and the usable travel range becomes larger.

In further embodiments of the invention, further weighting of one or two components prior to calculating the magnitude in the two sensor positions for the decision on what side the magnet resides, can additionally increase the robustness of the system. For example, already when doubling the length of the magnet in X direction two maxima and one minimum can occur in a normal magnitude function (without weighting). The decision on what side the magnet resides might then be taken erroneously in the center of the travel range when the inadmissible regions are not completely detected by the close region ("close to zero").

Figure 6:
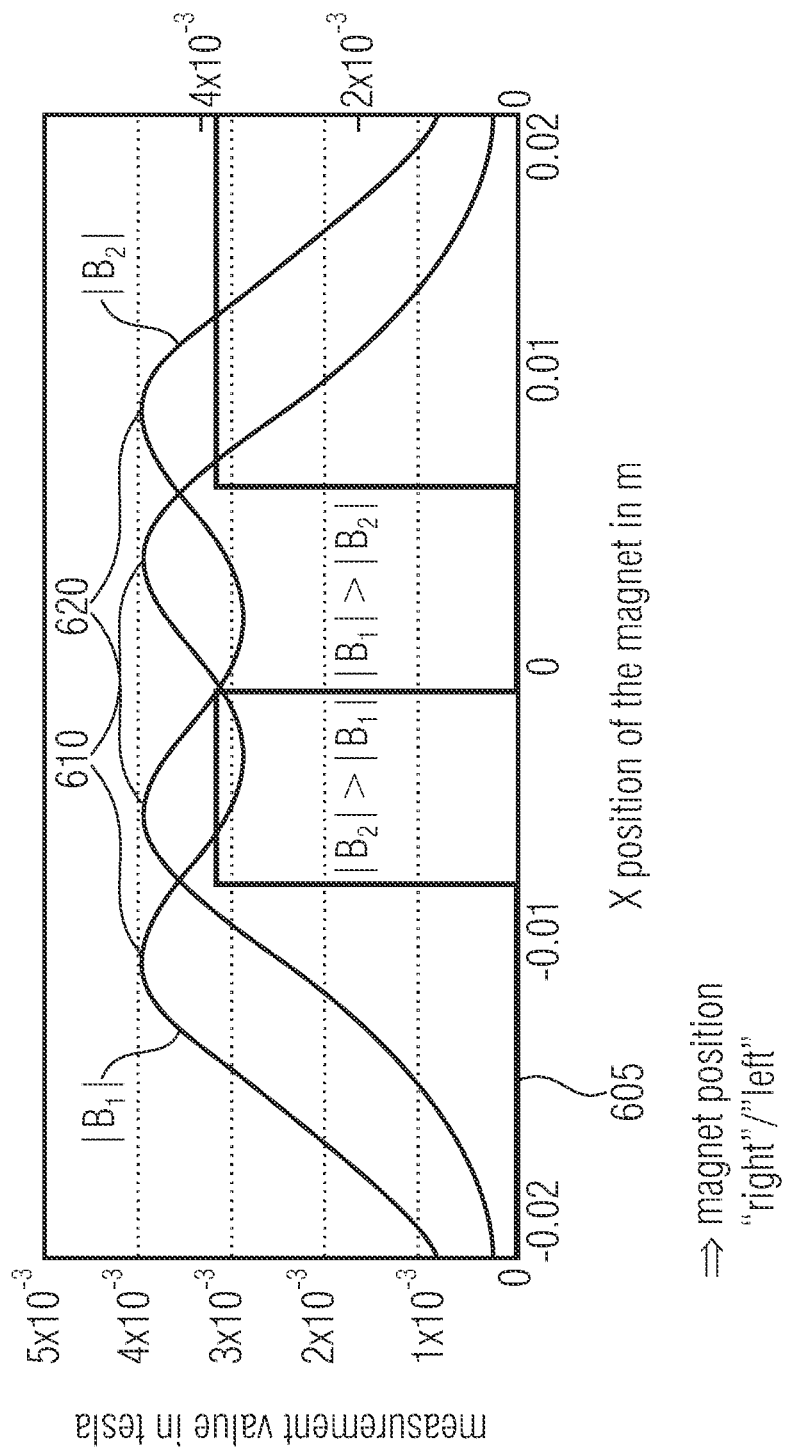
FIG. 6 are exemplary curves of magnitudes of a first combination quantity of two magnetic field components of a first magnetic field sensor and a second combination quantity of two magnetic field components of a second magnetic field sensor each having a double maximum.

Such a double maximum is shown exemplarily in FIG. 6. Here, curves $|B_1|$ and $|B_2|$ of FIG. 6 correspond essentially to the ones of FIG. 2, wherein in FIG. 2 each curve only has one maximum 210 or 220 and in FIG. 6 every curve has two maxima each (double maximum 610 or 620). Further, FIG. 6 shows an exemplarily compare function 605 for determining the magnet position, assuming, for example, a minimum (e.g. 0 T), when the magnitude $|B_1|$ of the first combination quantity is greater than the magnitude $|B_2|$ of the second combination quantity, and a maximum (e.g. $>3 \times 10^{-3}$ T), when the condition $|B_2|>|B_1|$ is fulfilled. Here, the minimum of the compare function 605 in particular corresponds to the first position ("left"), while the maximum corresponds to the compare function 605 of the second position ("right") of the indicator magnet 105. As can be seen in FIG. 6, in the case of the double maximum, clear position determination is impeded or not possible at all.

In further embodiments of the invention, the processing means 130 is implemented to weight the detected magnetic field component $B_y$ or the detected magnetic field component $B_z$ with a further weighting factor, such that the double maximum of the magnitude function is avoided. In particular, for example, the detected magnetic field component $B_z$ can be weighted with the further weighting factor of less than or equal to 0.75.

Figure 7:
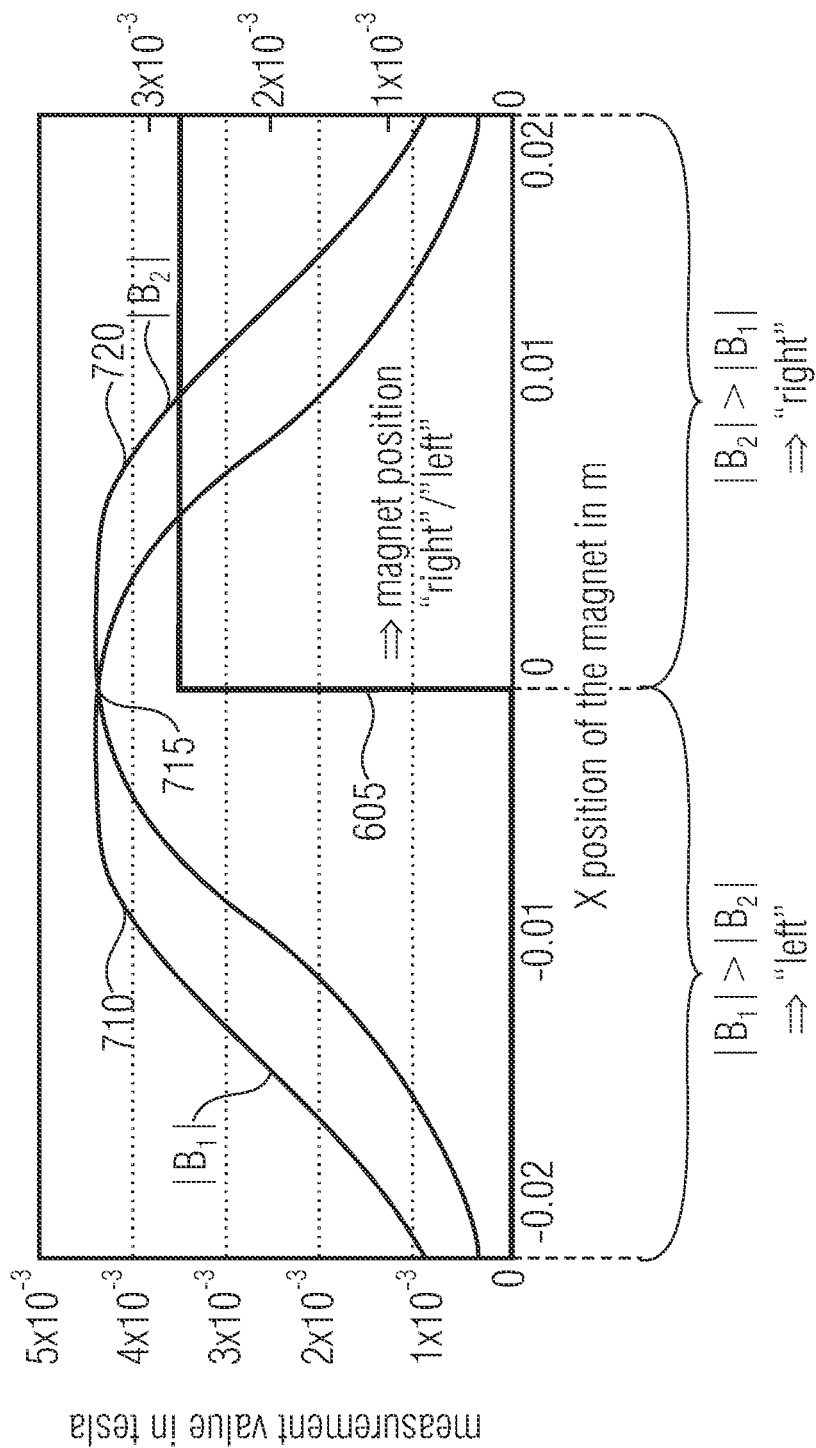
FIG. 7 are exemplary curves of magnitudes of a first combination quantity of two magnetic field components of a first magnetic field sensor and a second combination quantity of two magnetic field components of a second magnetic field sensor where the double maximum has been reduced to one maximum each.

FIG. 7 shows an exemplary result of such a weighting, where the double maximum 610, 620 were each reduced to a maximum 710 or 720. In FIG. 7, curves $|B_1|$ and $|B_2|$ essentially correspond to the ones in FIG. 2, while, however, both curves already have a wider maximum 710 and 720 with respect to the X axis due to the weighting. Despite this broadening of maxima 710, 720, the position of the indicator magnet 105 can be determined uniquely, for example with the help of the compare function 705. Generally, the weighting functions should be selected such that curves $|B_1|$ and $|B_2|$ only have one intersection 715.

In particular, reduction of the weighting of the Z component prior to magnitude calculation is advantageous for both sensor positions. Already a factor of, for example, 0.75 for the Z component prior to magnitude calculation completely eliminates the double maximum in most fields of application.

In summary, by lower weighting of the Z component, the double maximum can be reduced to one maximum. This increases the robustness of the system in that a significantly larger number of magnet geometries can be used for position measurement.

In further embodiments of the invention, the processing means 130 is implemented to calculate the magnitude function by means of a CORDIC algorithm (CORDIC=Coordinate Rotation Digital Computer). The CORDIC algorithm is an efficient iterative algorithm which can be used, for example, for calculating a trigonometric function or the magnitude function. Calculating the magnitude function by means of the CORDIC algorithm can be performed both in the three-dimensional space and in the two-dimensional plane.

In further embodiments of the invention, there are the following two possible simplifications when using the CORDIC algorithm. The first simplification results when the perpendicular bisector of the sensor intersects the magnetic axis and the Y component of the magnetic field (i.e. the component $B_y$ in direction of the Y axis 103 corresponding to FIG. 1) is hence approximately zero at all positions of the travel range. Thus, the magnitude formation for detecting the side on which the magnet resides can be reduced to the magnitude formation in the plane, which is a significant simplification of the calculation.

The second simplification results due to the fact that the last part of the magnitude calculation (extracting the root) can be omitted, since only a comparison of two identically calculated magnitudes takes place. Accordingly, when the CORDIC algorithm is used for magnitude calculation, correction of the CORDIC factor in the plane can be omitted according to the first simplification or only has to take place once in the three-dimensional space.

Although herein absolute magnetic field values are used for detection or determination of the magnetization direction, usage of this procedure is also useful in gradient-based position measurement systems.

In further embodiments of the invention, in such systems, the processing means 130 can be implemented to determine, based on the first magnetic field component $B_{1x}$ and the third magnetic field component $B_{2x}$, a first gradient with respect to the first spatial direction (X direction 101) and, based on the second magnetic field component $B_{1z}$ and the fourth magnetic field component $B_{2z}$, a second gradient with respect to the first spatial direction by using a distance $d_{12}$ (see FIG. 1a) of the two sensor positions 115, 125. Here, the gradient can be calculated, for example, by a difference quotient. By the algorithm, merely a limitation of the maximum allowable spurious magnetic field quantity results, which is predetermined by the smallest magnetic field value at the edge of the travel range.

Thus, in embodiments, measuring a magnetic field can take place at at least two different locations, such that spatial magnetic field changes can be determined. By the magnetic field changes, spatial shifts or deviations, to which tiltings also belong, can be measured more accurately.

In particular, a spatial change of a magnetic field of the indicator magnet can be determined, thereby spurious quantities can be efficiently compensated and additional components, such as deviations (tiltings or twistings) can be determined. Thus, by using multi-dimensional magnetic field sensors, further embodiments allow the multi-dimensional measurement of a magnetic field. Since measurements can take place in different spatial directions at several locations, flow density changes along different spatial directions can also be determined. This allows in particular the determination of a gradient of the indicator magnetic field. By determining the gradient, measurement of the magnetic field can be implemented more accurately and in a manner that is less prone to errors. For example, by determining the gradient of a magnetic field, any tilting or deviation of the indicator magnet relative to the sensor assembly can be determined.

Finally, in further embodiments of the invention, based on information on the magnetization direction 107, a position of the indicator magnet 101 with respect to the reference point 155 can be determined.

Figure 8:
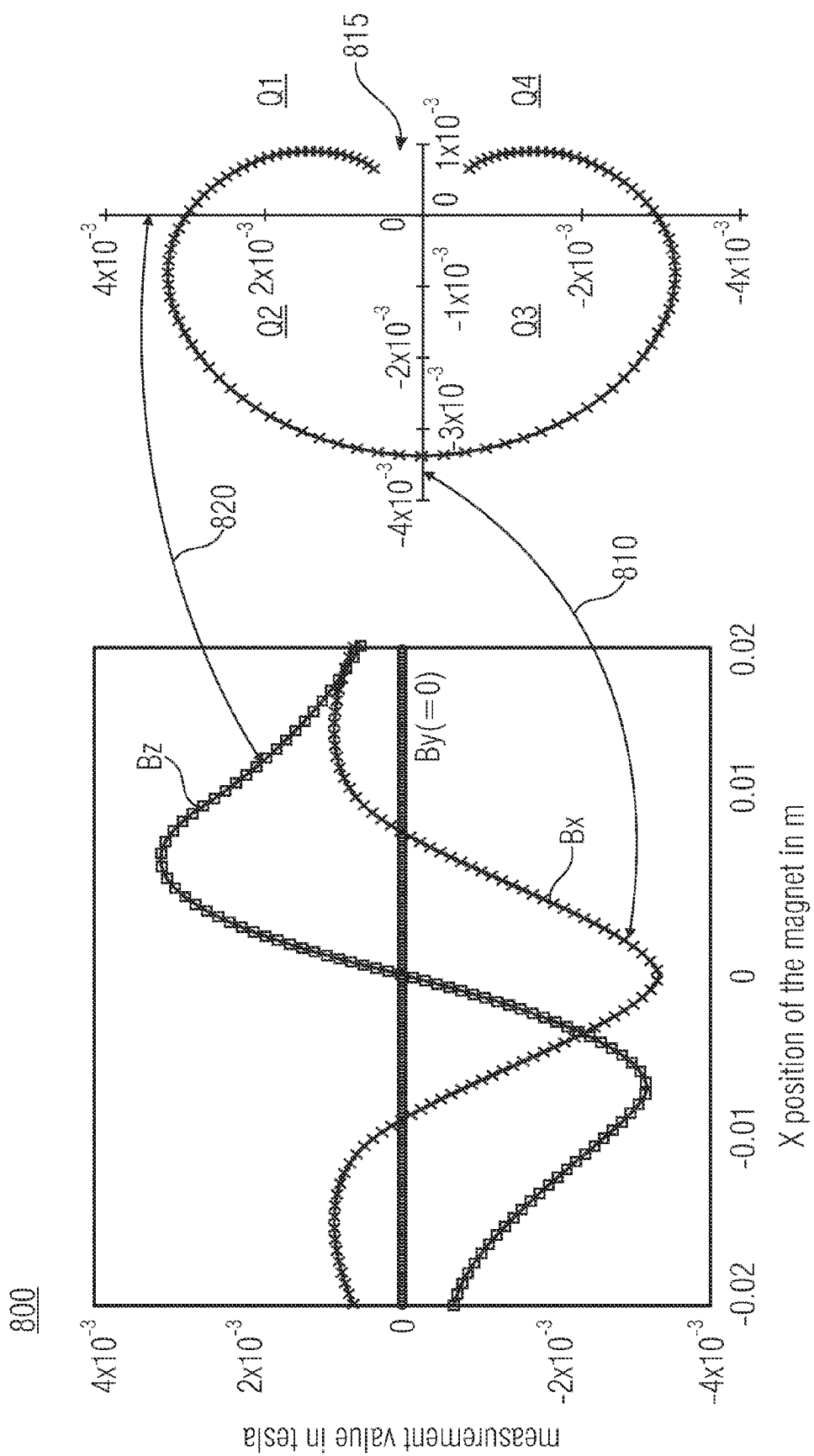
FIG. 8 is an exemplary evaluation diagram of a four-quadrant calculation of angles by using the X and Z component of a magnetic field of the indicator magnet.

For this, an inventive evaluation can be used, which differs from the variation described in the known technology essentially in that not the quotient is formed from detected magnetic field components $B_x$ and $B_z$ at first, but both components are used to perform a so called 4-quadrant angle calculation 800 (see FIG. 8). As can be seen in FIG. 8, the two components each represent value pairs in four quadrants (e.g. Q1, Q2, Q3 and Q4). Here, the allocation of the components to the quadrant is indicated by arrows 810, 820.

Figure 12:
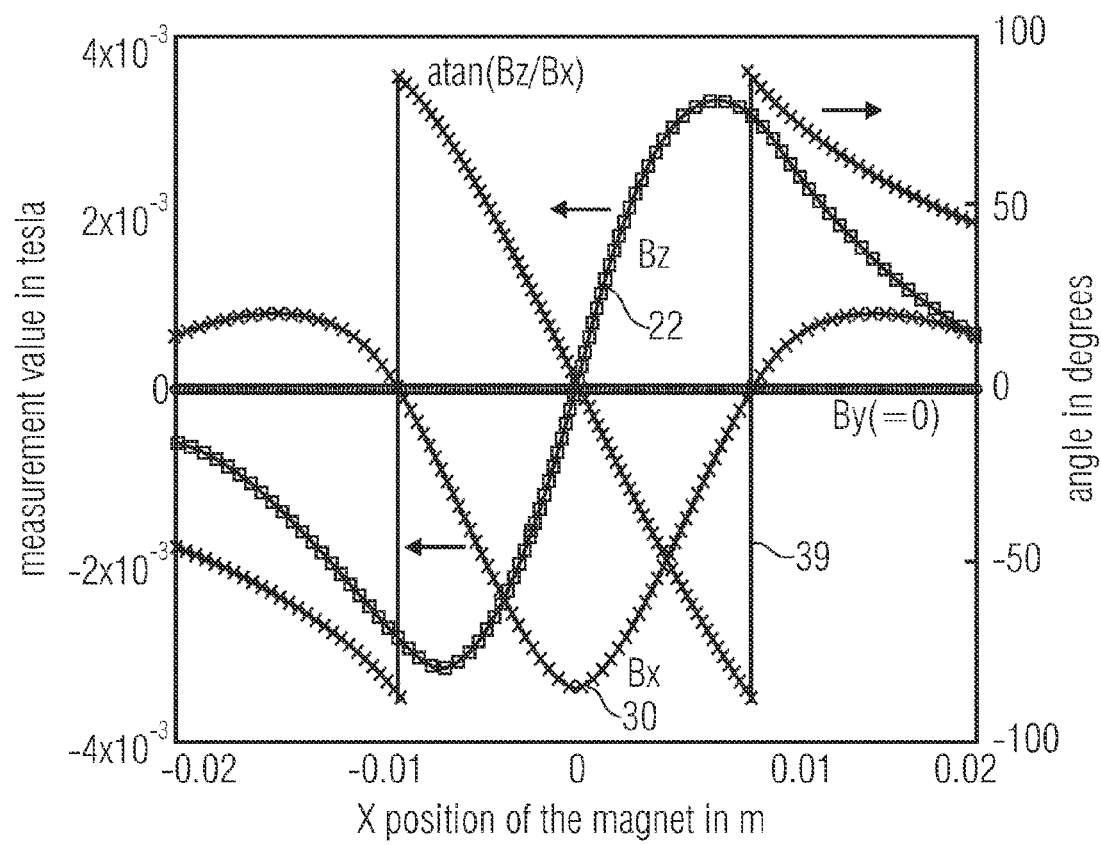
FIG. 12 is a further exemplary evaluation diagram corresponding to the sensor assembly shown in FIG. 10 by using X and Z components of the magnetic field.

A significant advantage in 4-quadrant angle calculation is that, in contrary to an evaluation via the ratio of two field components or via a calculation of its Arcustangens function, such as corresponding to FIG. 12, no discontinuity point 39 occurs in angles +/−90°. Further, by the 4-quadrant angle calculation, ambiguous evaluation of the signal can be avoided, since the allocation between the two components and the, for example, four quadrants Q1-Q4 is unique. Based on this unique allocation, in embodiments of the invention, a respective control of the signs in dependence on the respective quadrants can be ensured when calculating the Arcustangens function or the magnitude function in a so-called "vectoring" operating mode of the CORDIC algorithm.

Thus, the maximum possible travel range offered by the indicator magnet in connection with the magnetic field sensors becomes possible. Independence of temperature is maintained, since the position value results from the magnetic field direction and the direction of the field lines of a magnet does not change, even with variable magnet temperatures. By skilled selection of the signs, the angle calculation can be set such that an angle of 0° exactly corresponds to the position 0 mm. Thus, jump discontinuity 815 that cannot be avoided in angle calculation is moved toward the outside to the borders of the region. Since the respective magnetic field angle does not occur in the , the jump discontinuity does not have any spurious effect.

If the magnet or sensor is installed in a manner rotated by 180°, the jump discontinuity of the angle calculation is shifted to the position zero point (i.e. to the center of the measurement range). In many applications, this would not only be spurious but also prevent the of this method. Further, such a method would also present a criterion for exclusion in applications where the installation position of the magnets to the sensors is not predetermined. Thus, in the main field of , automation technology, such a position sensor could not be used. For that reason, systems having maximum travel range are generally not widely used, since here the magnetization direction of the magnet has to be taken care of very accurately.

However, in embodiments of the invention, when the magnetization direction is known, the 4-quadrant angle calculation can be controlled very easily such that the jump discontinuity is at the boundaries of the region and never in the center of the region (zero point).

In summary, the whole procedure for determining the magnetization direction can be easily represented in a flow diagram.

Figure 9:
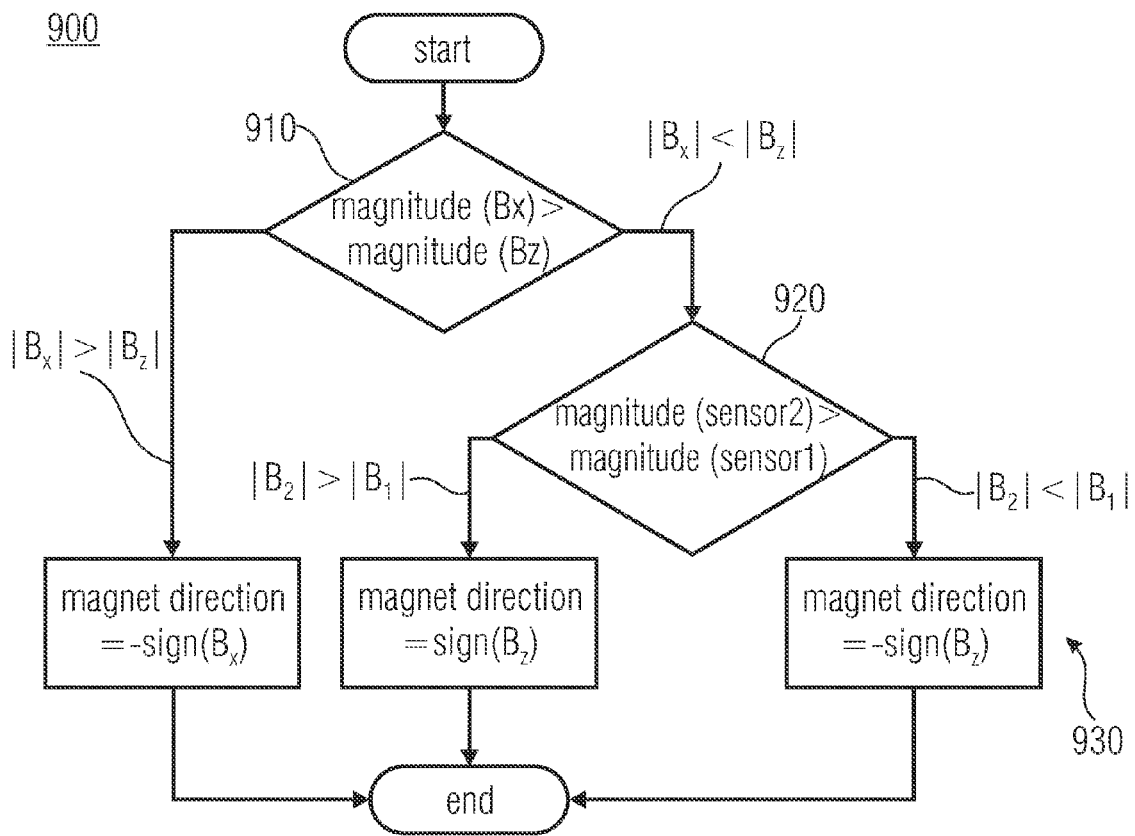
FIG. 9 is a flow diagram of a method for determining the position or magnetization direction of the indicator magnet according to the present invention.
Figure 10:
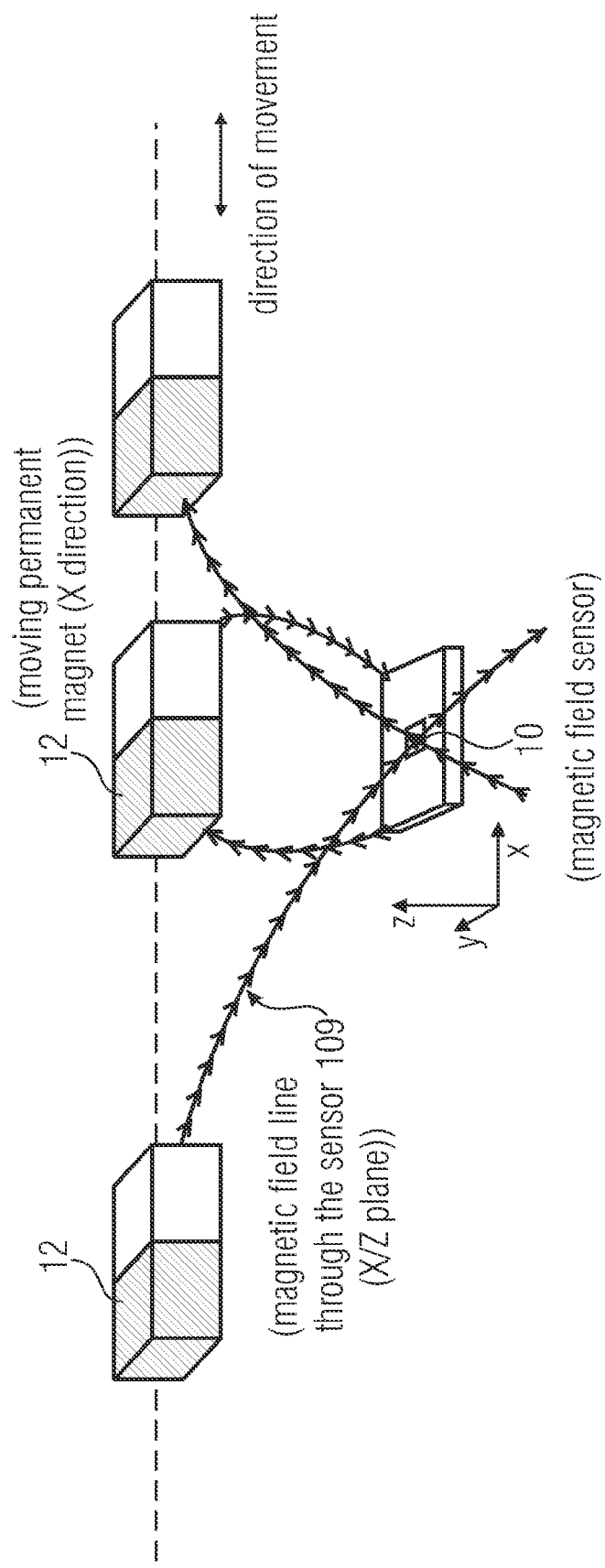
FIG. 10 is a schematic diagram of a known sensor assembly for position determination of an indicator magnet according to the known technology.
Figure 11:
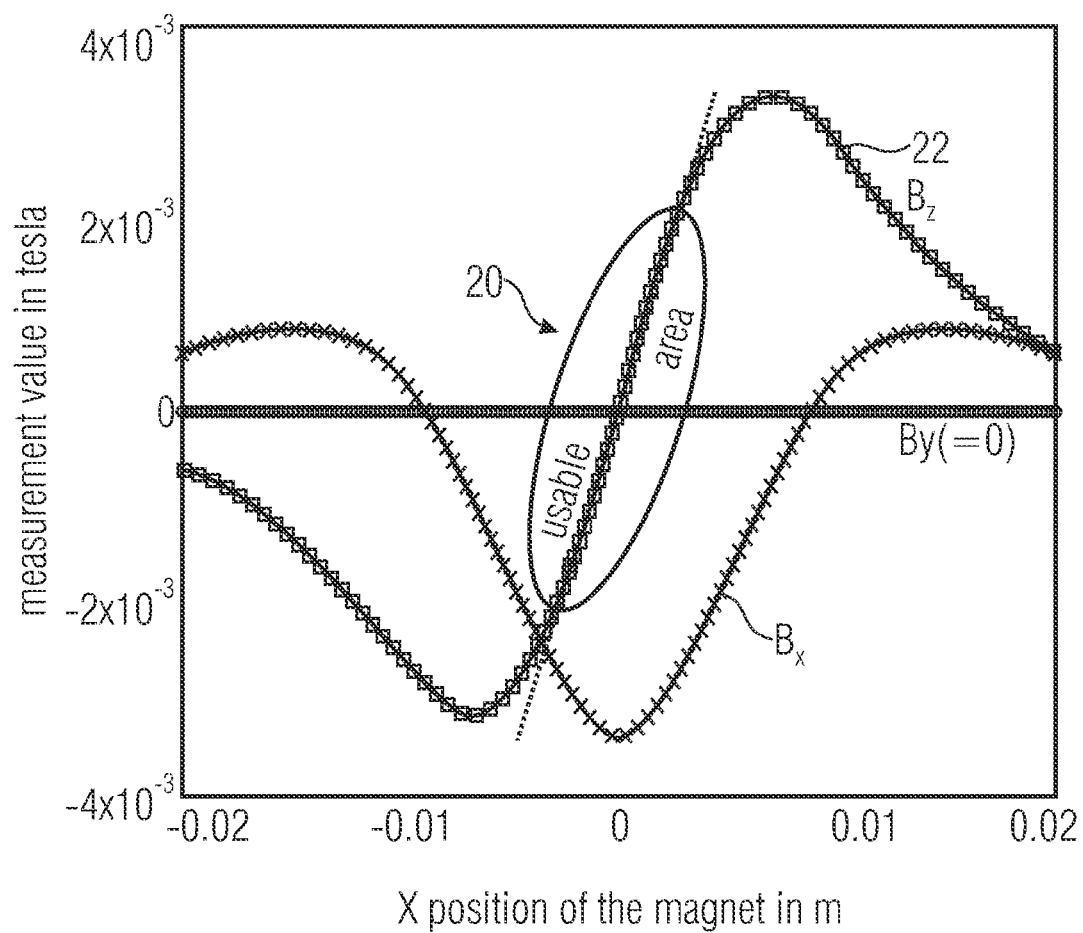
FIG. 11 is an exemplary evaluation diagram corresponding to the sensor assembly shown in FIG. 10 by using a Z component of a magnetic field of the indicator magnet.

FIG. 9 shows a flow diagram of a method 900 for determining the position or magnetization direction of the indicator magnet 105. In particular, the method 900 comprises two decision blocks 910, 920, wherein block 910 and block 920 can basically run independent of each other or also after one another. Here, blocks 910, 920 essentially correspond to method steps that have been described in detail in the context of FIG. 4 (block 910) or FIG. 2 (block 920). Based on the determined decisions, method 900 passes the respective branches, each starting from block 910, 920. In further subsequent method steps 930, the magnetization direction is determined as described in detail above, either based on the sign of the X component ($B_x$) or on the sign of the Z component ($B_z$). Thus, two decisions are necessitated in order to be able to derive the magnetization direction from the sign of a component of the measured magnetic field.

While some aspects have been described in the context of an apparatus, it is obvious that these aspects also represent a description of the respective method, such that a block or device of an apparatus or device can also be considered as a respective method step or feature of a method step. Analogously, aspects having been described in the context of or as a method also represent a description of a respective block or detail or feature of a respective apparatus.

Depending on specific implementation requirements, embodiments of the invention can be implemented in hardware or in software. The implementation can be performed by using a digital memory medium, for example a floppy disc, DVD, Blu-Ray disc, CD, ROM, PROM, EPROM, EEPROM or flash memory, a hard drive or another magnetic or optical memory having electronically readable control signals stored thereon, that can cooperate or cooperates with a programmable computer system such that the respective method is performed. Thus, the digital memory medium can be computer-readable. Thus, some embodiments according to the invention comprise a data carrier comprising electronically readable control signals that are able to cooperate with a programmable computer system such that one of the methods described herein is performed.

Generally, embodiments of the present invention can be implemented as computer program product having a program code, wherein the program code is effective to perform one of the methods when the computer program runs on a computer. The program code can, for example, also be stored in a machine-readable carrier. In some embodiments, a programmable logic device (for example a field programmable gate array, an FPGA) can be used to perform some or all functionalities of the methods described herein. In some embodiments, a field programmable gate array can cooperate with a micro processor.

Thus, the present invention provides a concept by which the position of the magnetization direction of the magnet can be detected during operation. When the magnetization direction is known, the sign of the X component of the magnetic field can be easily reversed, when needed, such that, for example, in a 4-quadrant angle calculation, the angle 0° again coincides with the position 0 (cf. FIG. 8). Independent of the magnetization direction of the used magnet, the spurious jump discontinuity is at the boundaries of the measurement range.

It is an advantage of the present invention that the evaluation can be performed such that a travel range of the indicator magnets relative to the sensor assembly that is as large as possible is possible, and that the measurement is robust, i.e. independent of magnet temperature, sensor temperature and other spurious influences.

Thus, the present invention is also advantageous in that in an unknown assembly of the indicator magnet with respect to the sensor assembly are in a location of the indicator magnet by 180° with respect to the two magnetic field sensors, the position of the indicator magnet can be detected during operation, which again allows automatic detection of the magnetization direction of the indicator magnet.

It is a further advantage of the present invention that, for example, the 4-quadrant angle calculation can be easily used for position measurement with maximum travel range. Independent of the magnetization direction, the measurement system provides the correct position value. When the sign of the position value is also switched in an appropriate manner together with the magnetization direction, the measurement system can be configured such that the sensor or the magnet serves as a reference system. Here, in the first case, the magnetization direction is of no importance for the position measurement value, while in the second case a rotation of the magnet by 180° provides exactly the negative position measurement value. The option of selecting the reference system results only in connection with the present invention.

The main field of the present invention is in the field of automation technology. There, pneumatic cylinders are used in diverse designs. In more than 90% of the cases already today, these pneumatic cylinders have a magnet integrated in the piston in order to be able to trigger magnetic limit switches. More and more frequently, the existing limit switches are replaced by linearly measuring sensors in terms of improved production monitoring and increased production quality.

With this refitting, it is not known in which magnetization direction the magnet existing in the piston has been installed in the pneumatic cylinder. Apart from that, it should be possible to install the linearly measuring refitting sensor in both possible positions. The decision for one of the two possible incorporation examples is frequently influenced by the construction circumstances in the overall system. For example, the connecting cable is to be routed as directly as possible to the evaluation unit.

In all cases, the sensor is to be immediately ready for operation after installment without expensive calibration operations. In this case, the invention allows the realization of a position sensor with the maximum possible travel range for this application.

The present invention can be advantageously used in many other fields, where a simple to use and at the same time robust position measurement is of importance. In other fields where 4-quadrant angle calculation could be used for position calculation, the invention can also be advantageously used for simplifying production and for reducing possible error sources.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A sensor assembly for determining a magnetization direction of an indicator magnet, comprising:
    a first magnetic field sensor configured to detect a first magnetic field component of the indicator magnet with respect to a first spatial direction and a second magnetic field component of the indicator magnet with respect to a second spatial direction, wherein the first and second spatial directions are linearly independent spatial directions;
    a second magnetic field sensor configured to detect a third magnetic field component of the indicator magnet with respect to the first spatial direction and a fourth magnetic field component of the indicator magnet with respect to the second spatial direction;
        wherein the first magnetic field sensor and the second magnetic field sensor are arranged spaced apart from one another; and
    a processor implemented to:
        combine a first value derived from the first magnetic field component and a second value derived from the second magnetic field component to acquire a first combination result;
        combine a third value derived from the third magnetic field component and a fourth value derived from the fourth magnetic field component to acquire a second combination result;
        determine a position of the indicator magnet with respect to the sensor assembly based on a comparison of the first combination result and the second combination result; and
        determine the magnetization direction based on the determined position of the indicator magnet with respect to the sensor assembly and on a sign of a detected magnetic field component with respect to the second spatial direction.

2. The sensor assembly according to claim 1, wherein the first magnetic field sensor and the second magnetic field sensor are implemented to each detect the first magnetic field component and the third magnetic field component in an axial direction and the second magnetic field component and the fourth magnetic field component in a radial direction with respect to a relative direction of movement of the indicator magnet with respect to the sensor assembly.

3. The sensor assembly according to claim 1, wherein the processor is implemented to determine a first position of the indicator magnet with respect to the sensor assembly, when a magnitude of the first combination quantity is greater than a magnitude of the second combination quantity, and to determine a second position of the indicator magnet with respect to the sensor assembly when the magnitude of the second combination quantity is greater than the magnitude of the first combination quantity.

4. The sensor assembly according to claim 3, wherein the processor is implemented to state, when the first position has been determined, a first magnetization direction at a positive sign of the second magnetic field component or the fourth magnetic field component, and to state a second magnetization direction when the second position has been determined, and to state, when the first position has been determined, the second magnetization direction at a negative sign of the second magnetic field component or the fourth magnetic field component, and to state the first magnetization direction when the second position has been determined.

5. The sensor assembly according to claim 1, wherein the processor is implemented to combine the first magnetic field component with the second magnetic field component and the third magnetic field component with the fourth magnetic field component, each in such a way that the magnitude of the first combination quantity represents a magnitude function and the magnitude of the second combination quantity represents a magnitude function.

6. The sensor assembly according to claim 5, wherein the processor is implemented to calculate the magnitude function by means of a CORDIC algorithm.

7. The sensor assembly according to claim 5, wherein the processor is implemented to weight the detected magnetic field component with respect to the first spatial direction or the detected magnetic field component with respect to the second spatial direction with a first weighting factor of less than or equal to 0.75.

8. The sensor assembly according to claim 1, wherein the first magnetic field sensor and the second magnetic field sensor are each implemented as multi-axis magnetic field sensor, wherein each sensor element of the multi-axis magnetic field sensor comprises a magnetic sensitivity with respect to the first spatial direction and the second spatial direction.

9. The sensor assembly according to claim 1, wherein the processor is further implemented
- to determine whether the indicator magnet is within a central region around a reference point of the sensor assembly, based on a comparison of a magnetic field component detected by the first magnetic field sensor or the second magnetic field sensor with respect to the first spatial direction with a magnetic field component detected by the first magnetic field sensor or the second magnetic field sensor with respect to the second spatial direction; and
- if the indicator magnet is within the central region, to determine the magnetization direction based on a sign of a detected magnetic field component with respect to the first spatial direction.

10. The sensor assembly according to claim 9, wherein the processor is implemented to state the first magnetization direction at a positive sign of the detected magnetic field component with respect to the first spatial direction, and to state the second magnetization direction at a negative sign of the detected magnetic field component with respect to the first spatial direction, when a magnitude of the detected magnetic field component with respect to the first spatial direction is greater than a magnitude of the detected magnetic field component with respect to the second spatial direction.

11. The sensor assembly according to claim 10, wherein the processor is implemented to determine the magnitude and the magnitude each via a magnitude function.

12. The sensor assembly according to claim 10, wherein the processor is implemented to weight the magnitude or the magnitude with a second weighting factor, such that the central region around the reference point is reduced.

13. The sensor assembly according to claim 12, wherein the processor is implemented to weight the magnitude with the second weighting factor between 0.25 and 1.

14. A non-transitory computer readable medium including a computer program for performing, when the computer program runs on a processor, the method for determining a magnetization direction of an indicator magnet with respect to a sensor assembly, wherein the sensor assembly comprises a first magnetic field sensor configured to detect a first magnetic field component of the indicator magnet with respect to a first spatial direction and a second magnetic field component of the indicator magnet with respect to a second spatial direction, wherein the first and second spatial directions are linearly independent spatial directions, and a second magnetic field sensor spaced apart therefrom configured to detect a third magnetic field component of the indicator magnet with respect to the first spatial direction and a fourth magnetic field component of the indicator magnet with respect to the second spatial direction, the method comprising:
- combining a first value derived from the first magnetic field component and a second value derived from the second magnetic field component to acquire a first combination result;
- combining a third value derived from the third magnetic field component and a fourth value derived from the fourth magnetic field component to acquire a second combination result;
- determining a position of the indicator magnet with respect to the sensor assembly based on a comparison of the first combination result and the second combination result; and
- determining the magnetization direction based on the determined position of the indicator magnet with respect to the sensor assembly and on a sign of a detected magnetic field component with respect to the second spatial direction.

15. A method for determining a magnetization direction of an indicator magnet with respect to a sensor assembly, wherein the sensor assembly comprises a first magnetic field sensor configured to detect a first magnetic field component of the indicator magnet with respect to a first spatial direction and a second magnetic field component of the indicator magnet with respect to a second spatial direction, wherein the first and second spatial directions are linearly independent spatial directions, and a second magnetic field sensor spaced apart therefrom configured to detect a third magnetic field component of the indicator magnet with respect to the first spatial direction and a fourth magnetic field component of the indicator magnet with respect to the second spatial direction, comprising:
- combining a first value derived from the first magnetic field component and a second value derived from the second magnetic field component to acquire a first combination result;
- combining a third value derived from the third magnetic field component and a fourth value derived from the fourth magnetic field component to acquire a second combination result;
- determining a position of the indicator magnet with respect to the sensor assembly based on a comparison of the first combination result and the second combination result; and
- determining the magnetization direction based on the determined position of the indicator magnet with respect to the sensor assembly and on a sign of a detected magnetic field component with respect to the second spatial direction.

16. The method according to claim 15, wherein the first magnetic field component and the third magnetic field component are detected in an axial direction and the second magnetic field component and the fourth magnetic field component in a radial direction with respect to a relative direction of movement of the indicator magnet with respect to the sensor assembly.

17. The method according to claim 15, wherein in the step of determining the position a first position of the indicator magnet with respect to the sensor assembly is determined, when a magnitude of the first combination quantity is greater than a magnitude of the second combination quantity, and a second position of the indicator magnet with respect to the sensor assembly is determined when the magnitude of the second combination quantity is greater than the magnitude of the first combination quantity.

18. The method according to claim 15, wherein in the step of determining the magnetization direction, when the first position has been determined, a first magnetization direction is stated at a positive sign of the second magnetic field component or the fourth magnetic field component, and when the second position has been determined, a second magnetization direction is stated, and when the first position has been determined, the second magnetization direction is stated at a negative sign of the second magnetic field component or the fourth magnetic field component, and when the second position has been determined, the first magnetization direction is stated.

19. The method according to claim 15, wherein the first magnetic field component is combined with the second magnetic field component and the third magnetic field component with the fourth magnetic field component, such that the magnitude of the first combination quantity represents a magnitude function and the magnitude of the second combination quantity represents a magnitude function.

20. The method according to claim 15, further comprising:
determining whether the indicator magnet is within a central region around a reference point of the sensor assembly, based on a comparison of a magnetic field component detected by the first magnetic field sensor or second magnetic field sensor with respect to the first spatial direction with a magnetic field component detected by the first magnetic field sensor or second magnetic field sensor with respect to the second spatial direction;
if the indicator magnet is within the central region, determining the magnetization direction based on a sign of a detected magnetic field component with respect to the first spatial direction; and
if the indicator magnet is outside the central region, determining the magnetization direction according to the method for determining a magnetization direction of an indicator magnet with respect to a sensor assembly, wherein the sensor assembly comprises a first magnetic field sensor for detecting a first magnetic field component with respect to a first spatial direction and a second magnetic field component with respect to a second spatial direction, and a second magnetic field sensor spaced apart therefrom for detecting a third magnetic field component with respect to the first spatial direction and a fourth magnetic field component with respect to the second spatial direction, the method comprising:
combining the first magnetic field component and the second magnetic field component to acquire a first combination quantity;
combining the third magnetic field component and the fourth magnetic field component to acquire a second combination quantity;
determining a position of the indicator magnet with respect to the sensor assembly based on a comparison of the first combination quantity and a second combination quantity; and
determining the magnetization direction based on the determined position of the indicator magnet with respect to the sensor assembly and on a sign of a detected magnetic field component with respect to the second spatial direction.

\* \* \* \* \*